(No Model.) 2 Sheets—Sheet 1.
F. M. TRIBBETT.
DEVICE FOR OPENING OR CLOSING FARM GATES AUTOMATICALLY.
No. 523,821. Patented July 31, 1894.
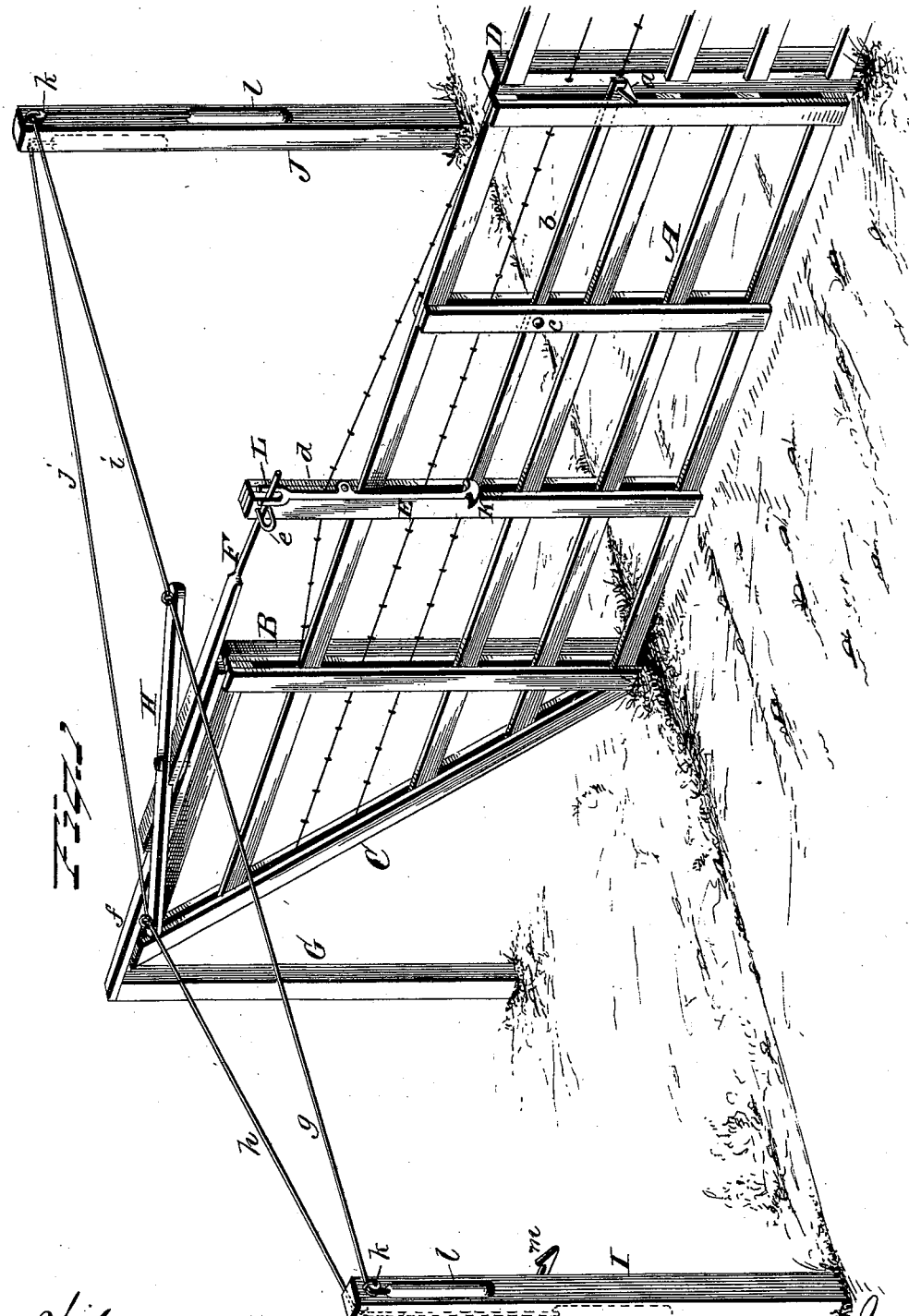

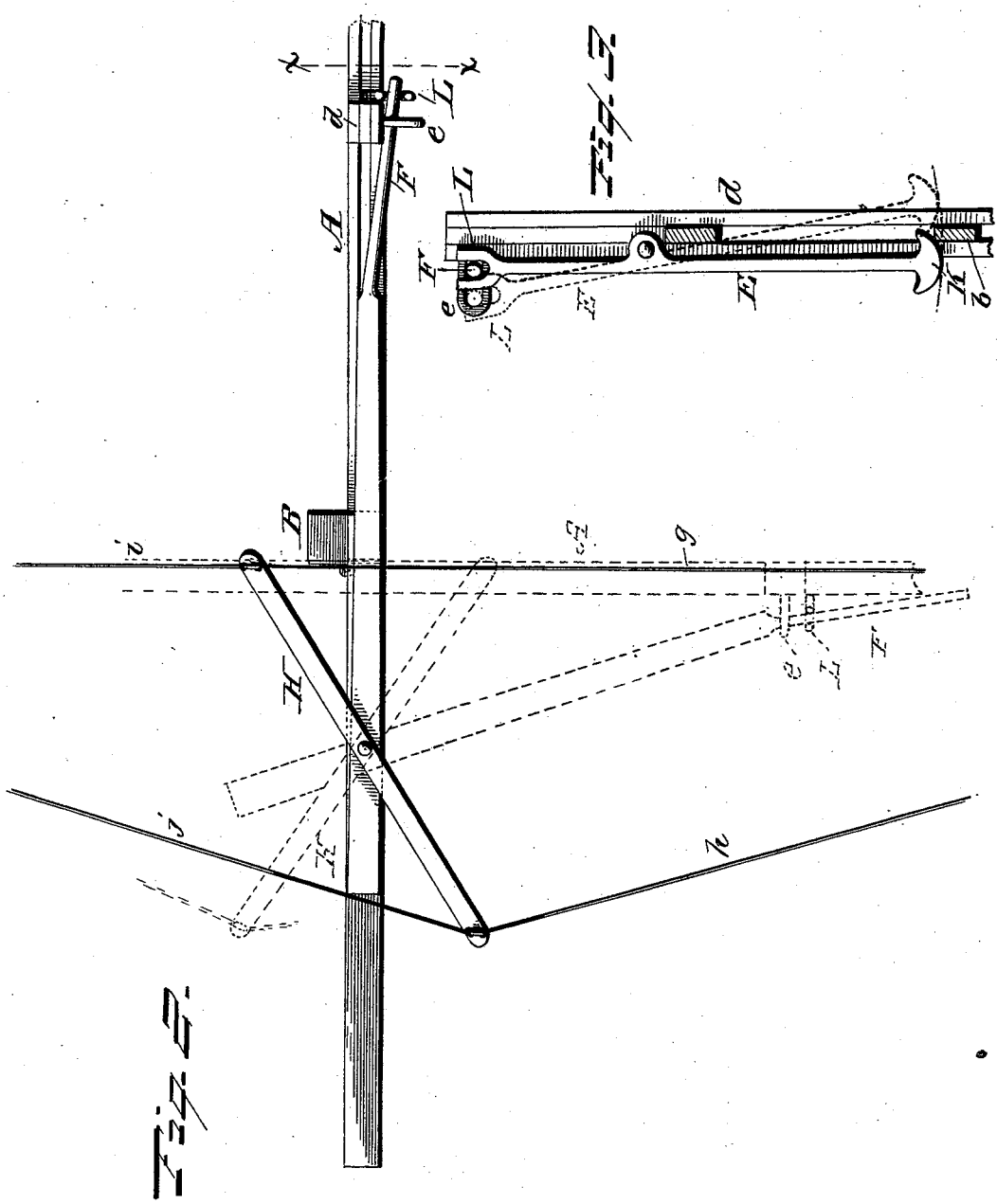

UNITED STATES PATENT OFFICE.

FRANCIS M. TRIBBETT, OF ABINGDON, ILLINOIS.

DEVICE FOR OPENING OR CLOSING FARM-GATES AUTOMATICALLY.

SPECIFICATION forming part of Letters Patent No. 523,821, dated July 31, 1894.

Application filed February 28, 1894. Serial No. 501,891. (No model.)

*To all whom it may concern:*

Be it known that I, FRANCIS M. TRIBBETT, a citizen of the United States, residing at Abingdon, in the county of Knox and State of Illinois, have invented certain new and useful Improvements in Farm-Gates; and I do hereby declare that the following is a full, clear, and exact description of the same, reference being had to the annexed drawings, making a part of this specification, and to the letters and figures of reference marked thereon.

The present invention has relation to that class of farm-gates which are adapted to swing upon a hinged connection and provided with suitable means whereby the gate may be opened and closed by the approaching and retiring traveler without the necessity of alighting from the vehicle.

The invention consists in a novel device for operating the latch whereby the gate is conveniently released from its fastenings and swung open and closed by the person in the vehicle without alighting therefrom, substantially as shown in the drawings and hereinafter described and claimed.

Figure 1 of the drawings is a perspective view of a swinging gate with my improved means for operating it and the latch; Fig. 2 a detail view on an enlarged scale showing a top plan of the operating mechanism and the gate, the same being shown in the two positions in full and dotted lines respectively; Fig. 3 a detail view of the latch operating mechanism.

In the accompanying drawings A represents a swinging gate of the ordinary construction, hinged in the usual manner to a stationary post B and provided at its rear end with a counter-poise extension C to balance the gate better when moving upon its hinged connection.

If desired the gate may have barbed wires connected to it as shown, but this is not essential or material and can therefore be dispensed with.

The gate is held closed by a latch-bar $b$ engaging with a keeper $a$ upon a fence-post D, said bar being pivoted at $c$ to the gate and having its greatest length forward so that it will fall to engage with the keeper by gravity when released by the pivoted lever E. This lever is of suitable length to reach down in contact with the latch-bar $b$ and is pivoted to the upright $d$ of the gate, which upright extends some distance above the same and has a suitable guide $e$ projecting out from the side thereof. Through this guide extends an operating rod F which may be of any suitable form at its rear and is pivoted to a cross-beam $f$ which connects the two posts B G between which the counter-poise extension C is located when the gate is in a closed position. To the rear portion of the rod F is secured the bar H, its ends, to which are connected cords $g$ $h$ $i$ $j$, being disposed at an acute angle thereto. These cords extend over pulleys $k$ upon either side of posts I J at the top thereof, said cords at their free ends having handles or pulls $l$ of sufficient weight to keep the cords taut. These handles or pulls are in convenient position to be reached by the occupant of a vehicle without the necessity of alighting therefrom and when the cord $g$ is pulled down upon the lever E will be forced into the position indicated in dotted lines of Fig. 3. Now this lever is of novel construction to adapt it specially to the successful operation of the latch, having a curved head at its lower end to form a double cam K, and a bifurcation L at its upper end with which engages the operating rod F.

When the lever E moves, the cam K will force the rear end of the latch-bar $b$ down and simultaneously cause the front end of the bar to rise and disengage itself from the keeper $a$ and the gate to swing open and back to a position to have the latch-bar engage with the keeper $m$ upon the post I which will hold the gate open until again closed by pulling down upon the cord $i$.

When the vehicle is passing in an opposite direction from that already described, the cords $j$ and $h$ are operated to open and close the gate respectively.

The rod F may be pivoted in any suitable manner and may be of any suitable form and construction and provided with any suitable and well known means for operating it; and any suitable arrangement of cords and handles or pulls may be substituted for those shown.

The upper end of the lever E may have an eye or loop in place of a bifurcation which would serve the same purpose.

By referring to Fig. 2 of the drawings it will be seen that the operating rod at its front end extends at an angle to the rear portion thereof so that the rod will not require so great a swing to operate the lever which is considered very essential and important in not requiring so great a downward pull upon the cords. When the rod F is operated it will move sidewise or laterally and carry with it the upper end of the lever E which will bring the face of the double cam in contact with the latch-bar and operate it as previously stated, and immediately after the latch bar is disengaged the rod will strike the outer end of the guide e and the gate will be thrown back out of the way and held open by the keeper m upon the post I. The lever E will now assume the position indicated in dotted lines of Fig. 3 to be again operated to disengage the latch-bar with the keeper m, the cam being double enabling it to operate equally as well from either side.

Having now fully described my invention, what I claim as new, and desire to secure by Letters Patent, is—

1. In a swinging gate, a pivoted latch and means for operating it, consisting of a pivoted lever having a double cam at its lower end, cords having pulls or handles and intermediate connections between the lever and cords for actuating said lever, substantially as and for the purpose set forth.

2. A hinged gate having a pivoted latch-bar; a pivoted lever for operating the same, said lever having a double cam at its lower end; a pivoted operating rod extending through a guide upon an upright of the gate and engaging with the upper end of the lever; a bar connected to the rear end of the rod at an acute angle therewith, and cords connecting with the bar and provided with handles or pulls for operating them, substantially as and for the purpose specified.

FRANCIS M. TRIBBETT.

Witnesses:
PATRICK J. MURPHY,
GEORGE S. PRINDLE.